Jan. 19, 1926.  1,570,547
A. U. AVERA
TRACTOR
Filed June 18, 1921  3 Sheets-Sheet 1
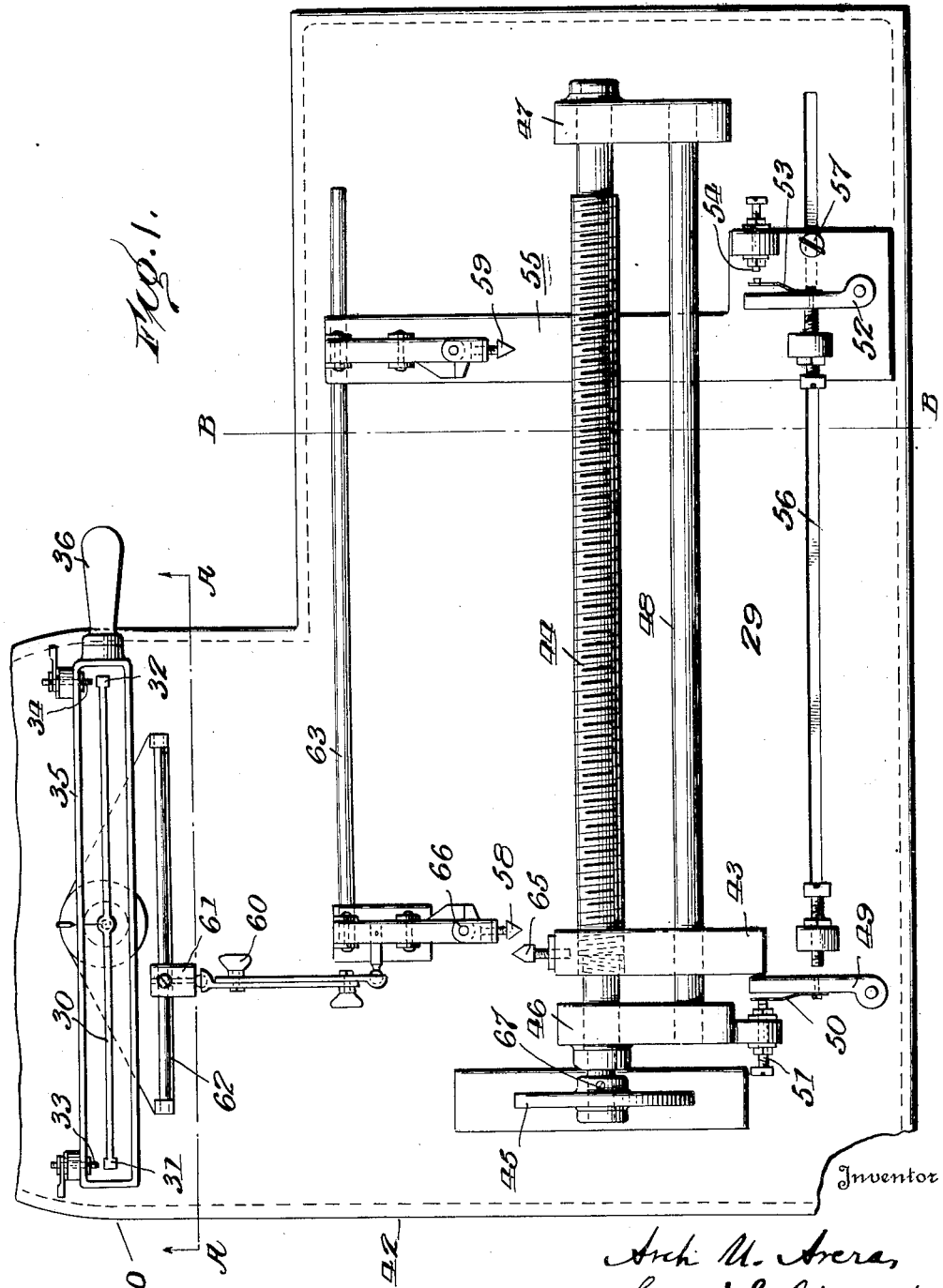

Jan. 19, 1926. 1,570,547
A. U. AVERA
TRACTOR
Filed June 18, 1921 3 Sheets-Sheet 2
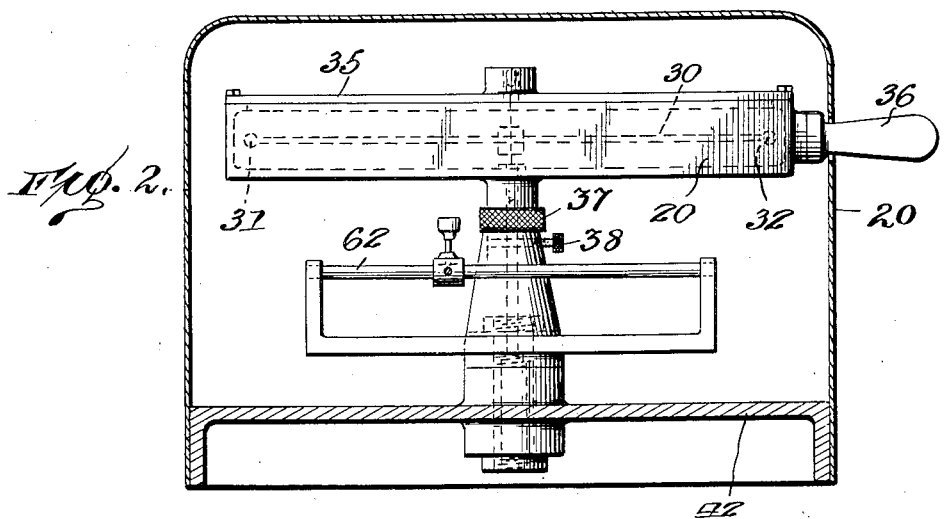
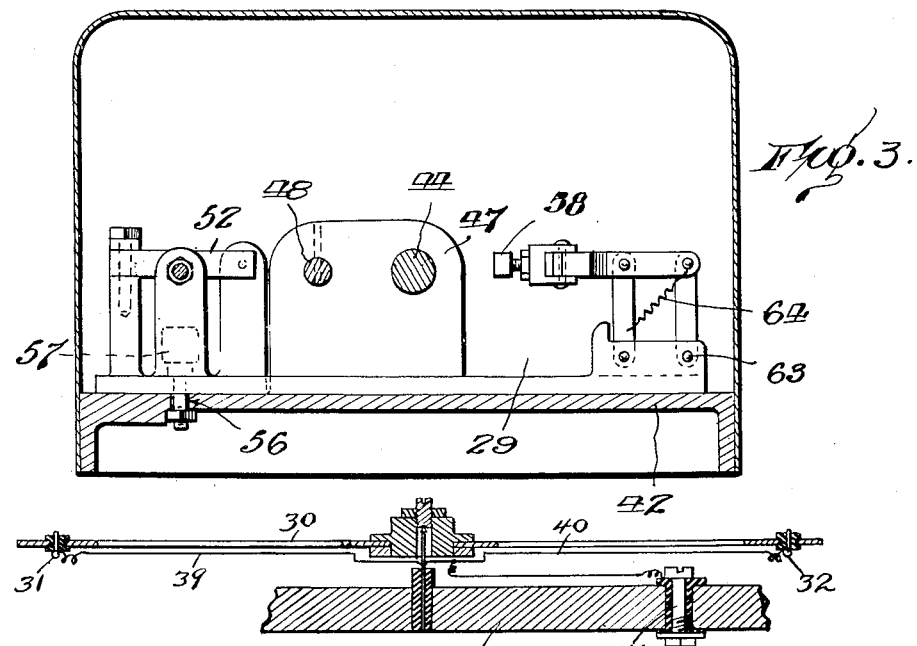

Jan. 19, 1926. 1,570,547
A. U. AVERA
TRACTOR
Filed June 18, 1921 3 Sheets-Sheet 3
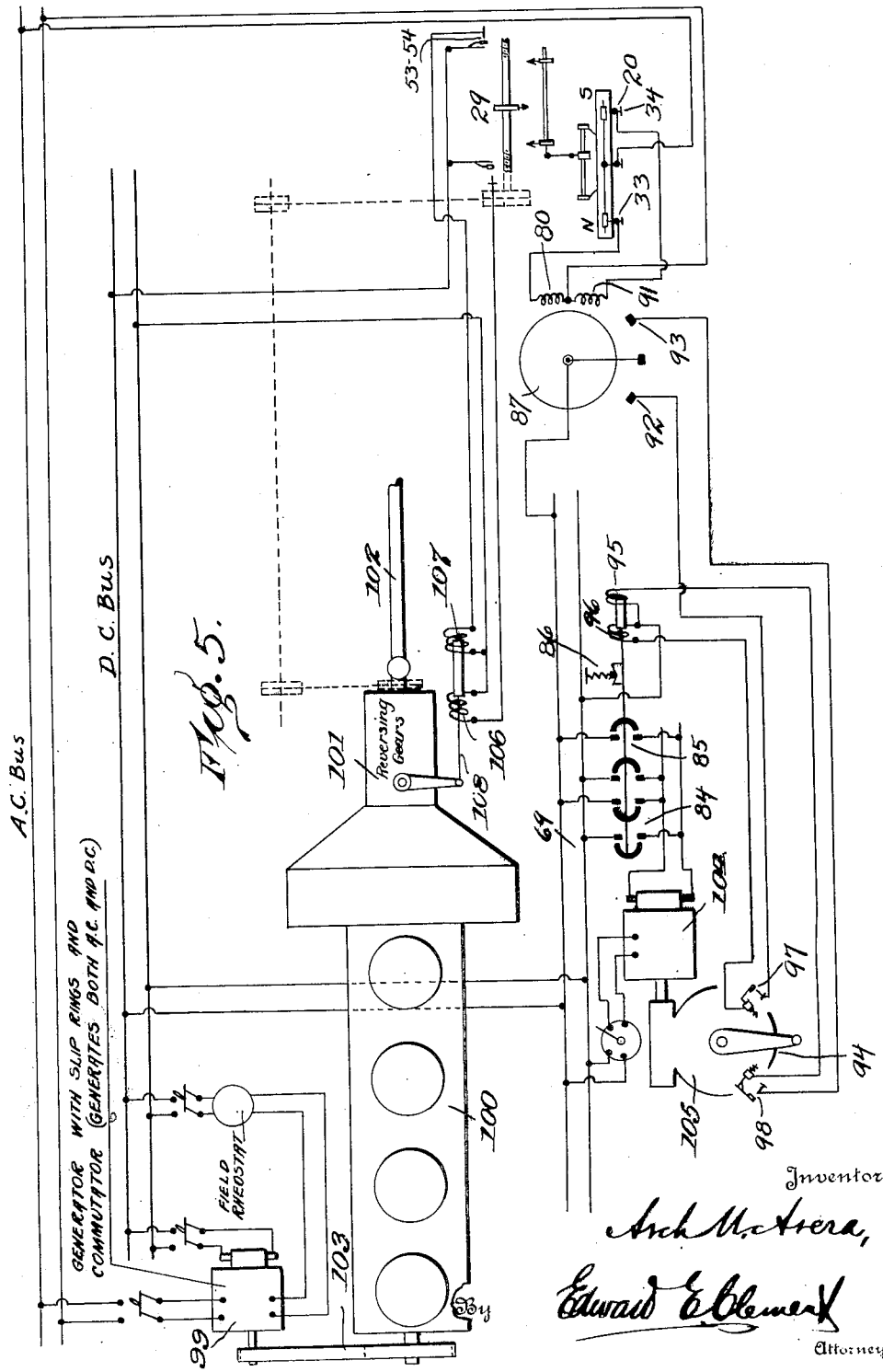

Patented Jan. 19, 1926.

1,570,547

UNITED STATES PATENT OFFICE.

ARCH U. AVERA, OF FLORENCE, ALABAMA.

TRACTOR.

Application filed June 18, 1921. Serial No. 478,610.

*To all whom it may concern:*

Be it known that I, ARCH U. AVERA, a citizen of the United States of America, residing at Florence, in the county of Lauderdale and State of Alabama, have invented certain new and useful Improvements in Tractors, of which the following is a specification, reference being had therein to the accompanying drawing.

My invention relates to power driven vehicles and more especially to tractors for agricultural purposes. It may however, be applied to such purposes as ice cutting.

The chief object of the invention is to provide a power driven vehicle automatically controlled so as to travel alternately forward and backward through a predetermined distance, offsetting its path of travel at each reversal of direction.

Other objects of the invention are to provide means, particularly adaptable to a machine of the above type, for automatically steering; for automatically reversing the direction of travel at the end of a predetermined distance; for automatically offsetting the path of travel; and various other novel means and novel combinations of means which make for efficiency and reliability of operation and which are described in the following specification and illustrated in the accompanying drawings.

In the drawings:

Fig. 1 is a top plan view of the control apparatus comprising the steering compass and the reversing and offsetting mechanism;

Fig. 2 is a section on the line A—A of Fig. 1;

Fig. 3 is a section on the line B—B of Fig. 1;

Fig. 4 is a fragmentary detail view on an enlarged scale of the compass needle and appurtenances;

Fig. 5 is a diagram of circuits and apparatus for an automatically controlled engine driven tractor.

Referring to the drawings in detail and first to Figs. 1 to 4, these show the automatic control mechanism comprising the steering compass 20 and the reverse and offset mechanism 29. The compass needle 30 is delicately supported on jewel bearings in the usual manner and carries contacts 31 and 32 cooperating with adjustable contacts 33 and 34 mounted in the compass box 35. The compass box 35 is arranged to be set in a "no contact" position for the particular direction of travel desired. The rough setting for this is accomplished by means of the setting and guiding handle 36, then the knurled clamping nut 37 is tightened and the exact setting accomplished with the micrometer adjusting screw 38. Magnetic action of the flow of current along the compass needle to the contacts 33 and 34 is avoided by using alternating current for the control circuit. To provide a conductor of low impedance for the alternating current, an aluminum wire 39 (Fig. 4) is used for joining the contacts 31 and 32 of the compass needle, the contacts 31 and 32 being preferably of platinum and insulated from the needle. As the actual movement of the needle is very small, it is practicable to use a metallic flexible connecting wire 40 between the aluminum wire 39 and an insulated binding post 41 mounted in the bottom wall of the compass box 35 (Fig. 4) for connection with the outside wiring.

The sensitiveness of the steering compass may be adjusted to any degree of fineness by bringing the cooperating pairs of contacts very close together. This is possible, due to the fact that the current of the compass control circuit is small (about one-half ampere), and any arc produced by the opening of one set of contacts will exist only until the other set of contacts engages. Two other conditions also tend to give immediate transference of current from the first point to the second that is it is an alternating current which will pass through zero potential at each cycle, and the maximum potential difference between the points of contact of the needle are low.

To guard against the influence of the magnetic parts of the machine the compass is to be mounted on a platform of non-magnetic material somewhat above the main body of the machine over the magnetic center. The compensating methods usually applied in the use of ships' compasses may also be used. The electrical connections between the steering compass and the steering motor 104 are indicated in the diagram, Fig. 5, and will be described later. It suffices to say here that the connections are such as to cause the machine to steer in such direction as to keep both sets of the compass contacts open.

The reversing mechanism 29 is mounted on a common mounting base 42, with the compass, and consists of a cam block 43 driven by a revolving threaded shaft 44 at a given ratio to the travel of the tractor in either direction by means of a chain drive wheel 45 connected to be driven at a speed in constant ratio to that of the machine, which connection is not shown but may be effected in any well known or other suitable manner, as by a chain connection to the transmission shaft such as indicated in dotted lines in Fig. 5. The threaded shaft 44 is journaled in the posts 46 and 47 which also support a stationary guide rod 48 which passes through the cam block 43 to guide it and prevent it from turning on the threaded shaft. The cam block in its extreme left hand position engages the reversing relay arm 49 to close the relay contacts 50 and 51, and when moved towards the right a predetermined distance engages the reversing relay arm 52 to close the contacts 53 and 54. To enable this predetermined distance to be varied, the contacts 53—54 are mounted on an adjustable support 55 guided in its movement along the base by the guide slot 56 and arranged to be locked in adjusted position by the wing nut 57.

To offset the machine laterally at each reversal of its travel I provide an offset mechanism cooperatively connecting the steering compass with the reversing mechanism. This offset mechanism comprises a pair of movable offset cams 58 and 59 mounted on the base 42 and adjustable support 55, respectively. The cam 58 is connected to the compass box 35 through adjustable linkage elements 60, 61 and 62, and is connected to move in unison with the cam 59 through a tie rod 63. Both cams 58 and 59 are resiliently held in the position shown by means of a retractile spring 64 which, as will be clear from an inspection of Fig. 3, tends to shorten the diagonal of the parallelogram, cam arm support in a manner to move the cam to the left. The cam 58 is arranged to be pushed back against the tension of the spring 64 when engaged by the actuating cam 65 traveling to the right (Fig. 1) but will not be pushed back by a left movement of the cam 65 due to the one way swinging joint 66. Conversely, the other cam 59 is effectively operated by a left hand movement only, of the cam 65.

As the cam 59 is mounted on the support 55, it is adjustable with the relay arm 52. To permit such adjustment of the cam, the tie rod 63 is connected therewith through a suitable key and slot connection to permit sliding without turning.

The wheel 45 for driving the threaded shaft 44 may be provided with a locking thumb screw 67 to enable the cam block 43 to be set at any point on the threaded shaft when starting the tractor.

A small generator 99 having a commutator and brushes as is usual with a direct current generator, and also having two slip rings connected to opposite points of the armature winding in the manner of a rotary converter, supplies power for controlling, reversing and guiding purposes. The generator 99, as shown, is arranged to supply a single phase alternating current to the "single phase A. C. bus" and a direct current to the "D. C. bus". The driving engine is indicated at 100 and is connected through a clutch and gear box 101 to the drive shaft 102, from whence connections to the drive wheel, not shown, may be of any known or other suitable form. The generator 99 is connected with the engine 100 through belt and pulley connections 103.

Alternating current must be used for the steering control circuit through the compass instead of direct current, because of the undesirable influence the latter would have on the compass needle.

The operation of the stopping and reversing mechanisms of the tractor drive is accomplished by means of direct current solenoids 106 and 107 through a suitable linkage system 108. This connection of the solenoids with the clutch and gear mechanism is such that the solenoid operated lever disengages the clutch, reverses the gears for travel in an opposite direction, and then re-engages the clutch with one swing of the solenoid operated lever.

Although not shown on the drawing, the "D. C. bus" may be used for charging the storage battery. By this means energy is stored for starting the engine, using the direct current generator as a motor. The battery may also provide current for ignition, etc. The steering motor 104 takes its power from the D. C. power bus 69 through a set of reversing contactors 84 and 85 normally held in an open position, by means of a spring and cam arrangement 86.

When the tractor is at an intermediate place in its travel, the contacts of the steering compass 20 are both open as shown. If the machine varies its direction of travel off that for which the compass is set, terrestrial magnetism causes the needle contacts to form a more or less steady contact with one of the stationary contacts 33 or 34. After this contact has been maintained for a given length of time, during which time the alternating current time limit relay 87 makes contact, the solenoid 80 or 91 of the time element relay for the correction of travel necessary is energized and the steering motor guides the tractor until correction in direction of travel is accomplished, the time element relay 87 controlling the reversing contactors 84 and 85 through contacts 92—93, limit switch 94 and solenoids 95 and 96.

The principle of operation of the time element relay 87 is the same as the commercial induction type relay and induction type watt hour meter used on single phase circuits.

In order to prevent the steering wheels being turned at too great an angle, I provide limit switch 94 connected as indicated with the steering gear 105 to open one or the other of the contacts 97 or 98 when the steering wheels are turned to a predetermined limit to the right or left as the case may be.

The object for the insertion of the adjustable time element relay in the control circuit is that, with the very close setting necessary for the compass contacts, the vibrations of the tractor will cause contacts of brief duration to occur, the time length of these contacts about equalling each other at the opposite ends of the needle. The relay allows these contacts to be repeated indefinitely without affecting the steering motor 104. However, when the direction of travel of the tractor varies for a time longer than that for which the relay 87 is set, then the length and strength of the contacts at one end of the needle will be much greater than the length and strength of those at the other end, or a continuous contact will be maintained at one point with the result that the time element relay will have time to act and energize the correct solenoid 95 or 96 for returning the direction of travel to normal.

When the tractor reaches the limit of travel for which the contacts 50—51 and 53—54 are set, the following results are accomplished in the sequence given:

The cam block 43 and with it the cam 65 passes to the right of the cam 59 which because of its one-way swinging joint snaps back into place with no operative effect. At this instant the lower end of the cam block 43 engages the arm 52 causing the reversing relay contacts 53—54 to close, reversing the direction of travel of the tractor. This reversal is effected through the energization of the solenoid 107. A change of location or off-setting of the plow is now effected by the return movement of the cam block which in passing to the left of the cam 59 pushes it back against the tension of its retractile spring, which motion is transmitted through the tie rod 63, to the left hand cam 58 and thence through the linkage 60 to the compass box 35, the compass box being returned to its original set position under tension of the cam retractile spring after the cam block has passed out of engagement with the cam 59. Similarly, when the tractor reaches the other end of its predetermined length of travel, the contacts 50—51 and cam 58 are actuated to reverse the direction of travel and offset the machine into another line parallel to the preceding.

For manually steering the tractor, the usual manual steering means, not shown, may be used, or the tractor may be steered by hand through suitable movement of the compass setting handle 36, Figs. 1 and 2.

While I have herein illustrated and described a preferred embodiment of my invention for the sake of disclosure, it is to be understood that I do not desire to be limited to such specific embodiment but contemplate all such modifications and variants thereof as fairly fall within the scope of the appended claims. Among such contemplated modifications is the use of an air cored coil in place of a magnetic needle in the steering compass.

I claim:

1. In a self propelled vehicle the combination of a prime mover, an electric generator driven thereby, and means energized from said generator for automatically controlling changes in the direction of movement of said vehicle and for automatically controlling the driving connections of said prime mover.

2. In a self propelled vehicle the combination of a prime mover, an electric generator driven thereby, and means energized from said generator for controlling the steering gear of said vehicle and for automatically controlling the driving connections of said prime mover.

3. In a self propelled vehicle the combination of an engine, reversing gears for said engine, an electric generator driven by said engine, and automatic means electrically energized from said generator for controlling said reversing gears.

4. In a self propelled vehicle the combination of a prime mover, an electric generator driven thereby, steering gears for the vehicle, manual means for controlling said steering gears, and automatic means energized from said generator for controlling said steering gears to maintain a predetermined direction of travel of the vehicle.

5. In a self propelled vehicle the combination of a prime mover, means driven by said prime mover for generating an alternating current and a direct current, means energized by said alternating current for controlling the steering gear of said vehicle and means energized by said direct current for controlling the driving connections of said prime mover.

6. In a self propelled vehicle, the combination of a prime mover, and driving means and automatic steering and reversing means deriving energy from said prime mover.

In testimony whereof I affix my signature.

ARCH U. AVERA.